(12) United States Patent
Wang et al.

(10) Patent No.: US 10,312,991 B2
(45) Date of Patent: Jun. 4, 2019

(54) METHOD AND APPARATUS FOR RECEIVING TRACKING AREA IDENTIFIER LIST

(71) Applicant: Samsung Electronics Co., Ltd., Gyeonggi-do (KR)

(72) Inventors: Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 538 days.

(21) Appl. No.: 14/373,334

(22) PCT Filed: Jan. 18, 2013

(86) PCT No.: PCT/KR2013/000397
§ 371 (c)(1),
(2) Date: Jul. 18, 2014

(87) PCT Pub. No.: WO2013/109080
PCT Pub. Date: Jul. 25, 2013

(65) Prior Publication Data
US 2015/0063199 A1    Mar. 5, 2015

(30) Foreign Application Priority Data

Jan. 18, 2012 (CN) .......................... 2012 1 0016323

(51) Int. Cl.
*H04B 7/155*   (2006.01)
*H04W 48/16*   (2009.01)
(Continued)

(52) U.S. Cl.
CPC .............. *H04B 7/155* (2013.01); *H04W 8/06* (2013.01); *H04W 48/16* (2013.01); *H04W 64/00* (2013.01);
(Continued)

(58) Field of Classification Search
CPC ..... H04W 64/00; H04W 36/36; H04W 88/02; H04W 64/003; H04W 64/006; H04W 48/16; H04W 8/06; H04W 84/005
See application file for complete search history.

(56) References Cited

U.S. PATENT DOCUMENTS 8,923,869 B2 *   12/2014   Zhang ............... H04W 36/0005
                                                                455/439
9,301,231 B2 *   3/2016    Zhang ............... H04W 36/0005
(Continued)

FOREIGN PATENT DOCUMENTS

EP          2375835 A1    10/2011

OTHER PUBLICATIONS

International Search Report dated Apr. 30, 2013 in connection with International Patent Application No. PCT/KR2013/000397, 3 pages.
(Continued)

*Primary Examiner* — Hoang-Chuong Q Vu

(57) ABSTRACT

The present invention provides a method for RN switching and location updating, a method for updating location of UE and a method for paging UE. Application of the methods of the present invention, can present each UE under the relay from initiating a tracking area update process, reduce network congestion, and save system sources.

10 Claims, 6 Drawing Sheets

(51) Int. Cl.
*H04W 64/00* (2009.01)
*H04W 8/06* (2009.01)
H04W 84/04 (2009.01)
H04W 84/00 (2009.01)
H04W 36/00 (2009.01)

(52) U.S. Cl.
CPC ...... *H04W 36/0009* (2018.08); *H04W 84/005* (2013.01); *H04W 84/047* (2013.01)

(56) References Cited

U.S. PATENT DOCUMENTS

| | | | |
|---|---|---|---|
| 9,467,872 B2* | 10/2016 | Yu | H04W 36/0055 |
| 9,749,982 B2* | 8/2017 | Hahn | H04W 60/00 |
| 2008/0003943 A1 | 1/2008 | Maheshwari et al. | |
| 2009/0042576 A1* | 2/2009 | Mukherjee | H04J 11/0093 |
| | | | 455/436 |
| 2010/0297999 A1* | 11/2010 | Iwamura | H04W 60/04 |
| | | | 455/440 |
| 2010/0311419 A1 | 12/2010 | Bi | |
| 2011/0000222 A1 | 1/2011 | Black et al. | |
| 2011/0165878 A1* | 7/2011 | Nylander | H04J 11/0069 |
| | | | 455/436 |
| 2011/0208842 A1 | 8/2011 | Mildh et al. | |
| 2011/0210845 A1* | 9/2011 | Xiong | H04W 60/00 |
| | | | 340/539.13 |
| 2012/0039246 A1* | 2/2012 | Zhang | H04W 68/02 |
| | | | 370/315 |
| 2012/0315913 A1* | 12/2012 | Yang | H04W 48/16 |
| | | | 455/438 |
| 2013/0003695 A1* | 1/2013 | Nylander | H04W 36/0083 |
| | | | 370/331 |
| 2013/0028161 A1* | 1/2013 | Maeda | H04L 5/0048 |
| | | | 370/311 |
| 2013/0053087 A1* | 2/2013 | Li | H04W 76/002 |
| | | | 455/518 |
| 2013/0183971 A1* | 7/2013 | Tamaki | H04W 36/0061 |
| | | | 455/436 |
| 2013/0203415 A1* | 8/2013 | Arvidsson | H04W 60/00 |
| | | | 455/435.1 |
| 2013/0273907 A1* | 10/2013 | Vikberg | H04W 8/02 |
| | | | 455/426.1 |
| 2013/0281090 A1* | 10/2013 | Maeda | H04W 48/02 |
| | | | 455/434 |
| 2013/0344890 A1* | 12/2013 | Hahn | H04W 60/00 |
| | | | 455/456.1 |
| 2014/0038620 A1* | 2/2014 | Hedberg | H04W 16/14 |
| | | | 455/448 |

OTHER PUBLICATIONS

Written Opinion of International Searching Authority dated Apr. 30, 2013 in connection with International Patent Application No. PCT/KR2013/000397, 4 pages.

* cited by examiner

[Fig. 4]
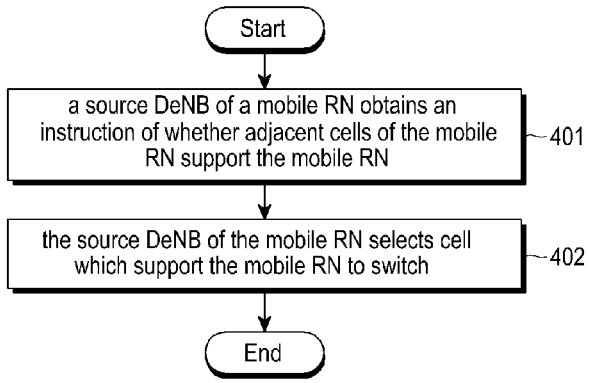
[Fig. 5]
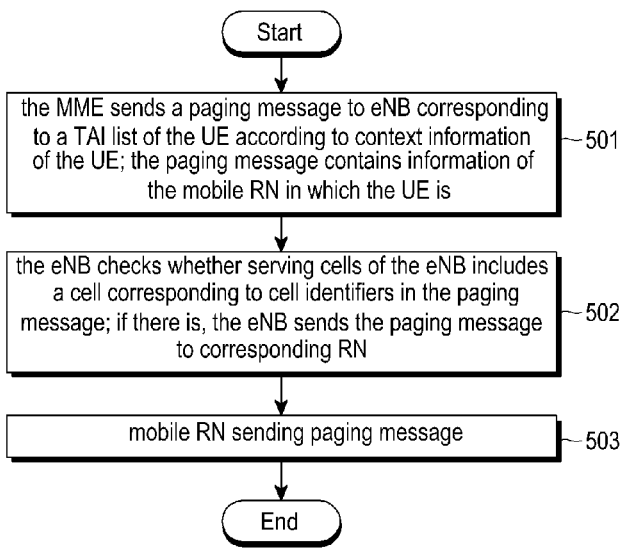
[Fig. 6]
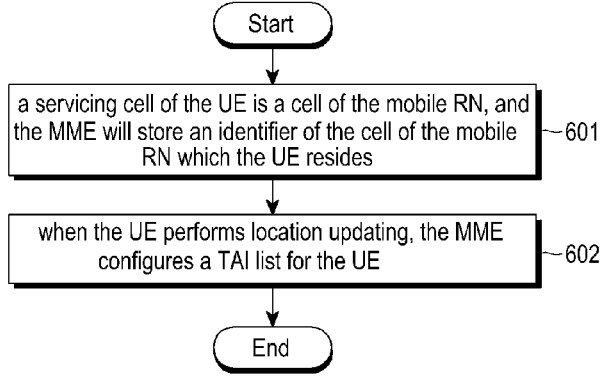

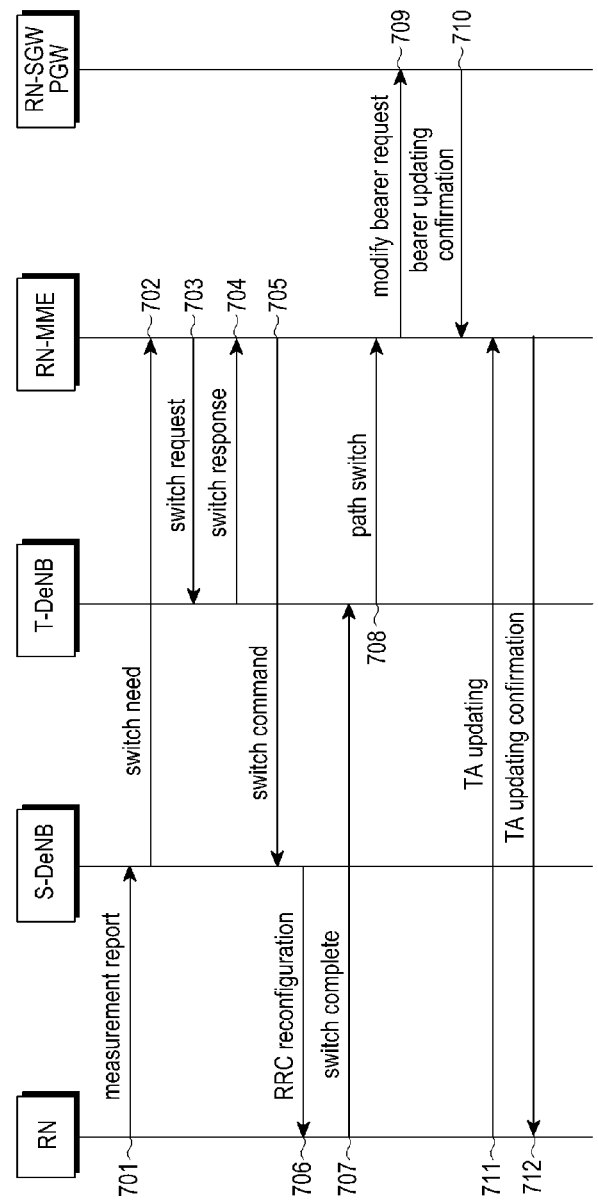
[Fig. 7]

[Fig. 8]
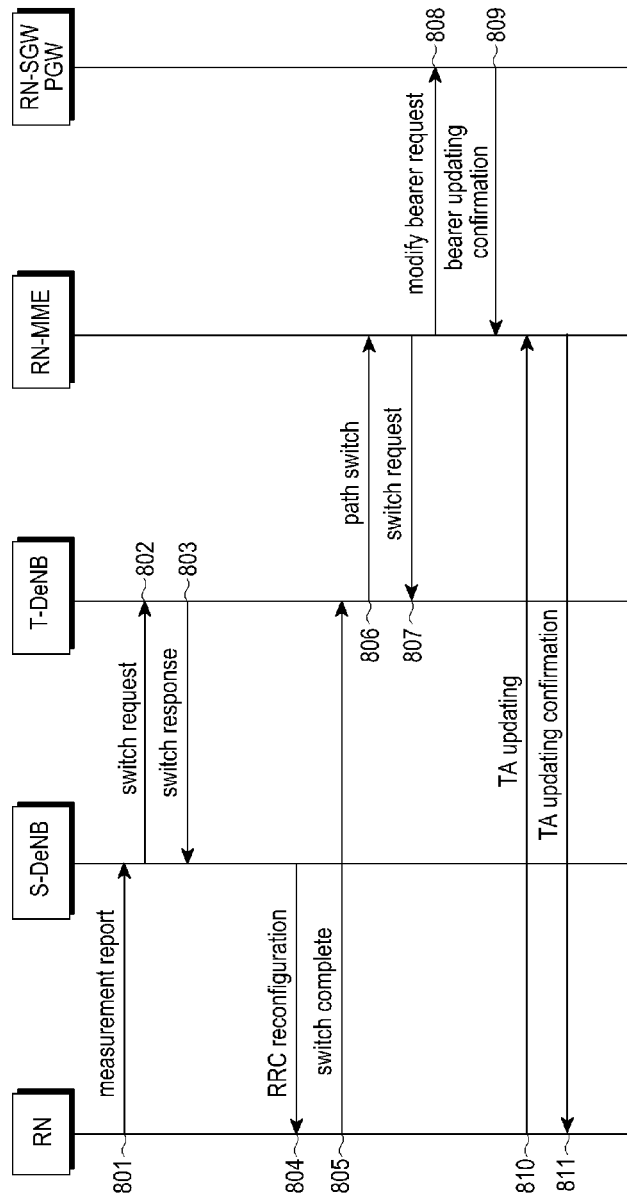

[Fig. 9]
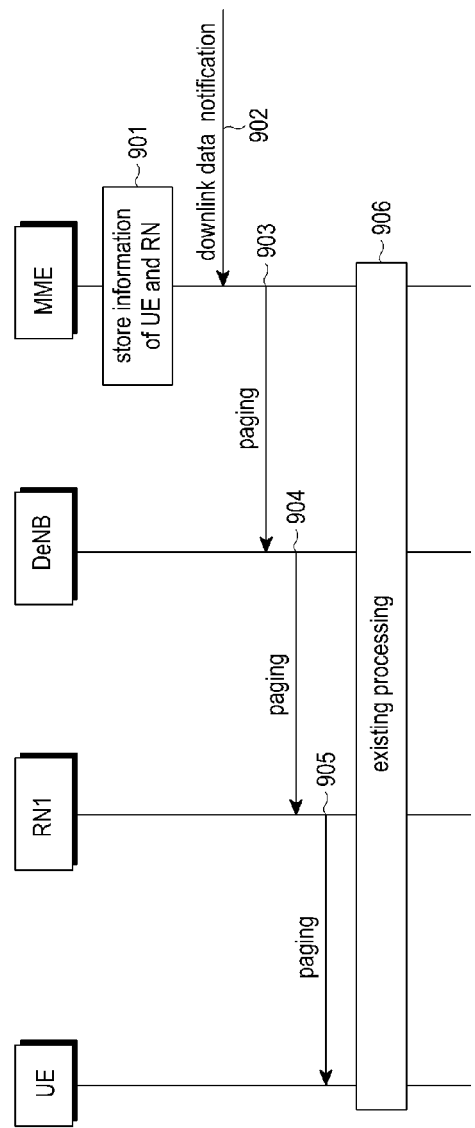

METHOD AND APPARATUS FOR RECEIVING TRACKING AREA IDENTIFIER LIST

CROSS-REFERENCE TO RELATED APPLICATION(S)

The present application claims priority under 35 U.S.C. § 365 to International Patent Application No. PCT/KR2013/000397 filed Jan. 18, 2013, entitled "METHOD FOR MOBILE RELAY NODE OBTAINING TA INFORMATION, METHOD FOR MOBILE RELAY NODE SWITCHING, METHOD FOR UPDATING LOCATION OF USER LOCATION AND METHOD FOR PAGING USER". International Patent Application No. PCT/KR2013/00397 claims priority under 35 U.S.C. § 365 and/or 35 U.S.C. § 119(a) to Chinese Patent Application No. 201210016323.0 filed Jan. 18, 2012, both of which are incorporated herein by reference into the present disclosure as if fully set forth herein.

TECHNICAL FIELD

The present invention relates to mobile communication systems, and more particularly to method for supporting group mobility, including a method for mobile Relay Node (RN) obtaining broadcast Tracking Area (TA) information, a method for mobile RN switching, and a method for updating user's location and a method for paging user.

BACKGROUND ART

FIG. 1 illustrates a schematic diagram of an existing Long Term Evolution (LTE) system which supports the relay node (RN).

In the wireless access network of the LTE system, the wireless resource management entity includes a macro base station (i.e., evolved Node B (eNB)) 101 and a RN 102 which is connected with a core network through another macro base station (i.e., Donor eNB (DeNB)) 103. The eNB 101 and DeNB 103 are connected each other via an X2 interface, and each eNB 101 is connected with a Mobile Management Entity (MME)/Servicing GateWay (S-GW) 104 in the core network through an S1 interface, respectively. The RN 102 accesses the DeNB 103 via an Un interface. The DeNB 103 provides an X2 proxy function between the RN 102 and other eNBs. The DeNB 103 provides an S1 proxy function between the RN 102 and the MME/S-GW 104. The S1 and X2 proxy functionality includes passing UE-dedicated S1 and X2 signaling between the RN 102 and the eNB 101, between the RN 102 and the MME 104, and between the RN 102 and the S-GW 104.

The currently defined relay is used in a fixed position, and does not support mobility of the relay between different cells. What is currently considered is how to apply the relay in a fast-moving train, for example in a train with a movement speed of 250-350 km per hour, and the wireless environment of the fast-moving train is rather special, for example, high noise, high penetration loss, serious Doppler frequency shift, and so on. The service quality provided by the existing relay cannot meet the needs of the operators, while the mobile relay is to solve the problems existing in the existing relay, to improve the quality of the service which can be provided in the fast-moving train to better meet the needs of users.

In the existing LTE system, when a User Equipment (UE) enters a cell and a Tracking Area Identifier (TAI) to which the cell belongs is not in a TAI list stored in the UE, the UE initiates a normal Tracking Area Update (TAU) process.

FIG. 2 illustrates a procedure for performing TAU process of the UE in the existing LTE system.

Step 201: a UE sends a TAU request message to an eNB. The UE sends the TAU request to the eNB through a Radio Resource Control (RRC) messages.

Step 202: the eNB sends the TAU request to an MME through an S1 message.

Step 203: the MME (i.e., new MME) obtains an old MME address according to a Globally Unique Temporary Identifier (GUTI) received from the UE. The new MME sends a context request message to the old MME to request for context information of the UE.

Step 204: the old MME sends context response message including context information of the UE to the MME.

Step 205: an authentication/certification process for the UE is implemented. This process is an optional step, is implemented only in certain circumstances.

Step 206: the MME sends a context confirmation message to the old MME.

Step 207: the MME sends a modify bearer request message to a S-GW/PDN GW.

Here, the detailed description of steps between the S-GW and PDN GW are omitted.

Step 208: the S-GW/PDN GW sends a modify bearer response message to the MME.

Step 209: the MME sends an update location request to a Home Subscriber Server (HSS).

Step 210: the HSS sends cancel location message to the old MME.

Step 211: the old MME sends a cancel location confirmation message to an old HSS.

Step 212: the HSS sends an update location confirmation message to the MME.

Step 213: the MME sends a TAU accept message to the UE.

Step 214: if the GUTI changes, the UE sends a TAU complete message to the MME to confirm to accept the new GUTI.

DISCLOSURE OF INVENTION

Technical Problem

It can be seen from the above TAU process that interaction of multiple messages is required when each UE performs a TAU process. For the special train application scene of the train, hundreds of users on the train move together with the train, this means that if the broadcast TAI of the RN changes, these users will perform the TAU process at the same time, and this will result in unnecessary waste of resources for the network and result in network congestion. Utilization of provisions of current protocols, a group of TAI lists can be configured for the user; when the user is on the train, a group of TAI lists which can be used in the route which the train runs along, so, users in an idle mode of the RN do not need to frequently switch. But, when paging a user, in the existing paging process, only TAI list is contained in a paging message sent to an eNB by the MME, and since the route which the train runs along may be very long and there may be a plurality of trains equipped with the RN in the route and TAI lists of the UE in the plurality of RNs may be the same, thus, for the plurality of eNBs in the route which the train runs along, the RNs of the plurality of trains all need to send paging messages. This will result in frequent and unnecessary transmission of signaling for the Un interface and the Uu interface.

Furthermore, when the mobile RN moves to a new DeNB, in the new DeNB, as source DeNB needs to select an appropriate target cell for the mobile RN.

When the mobile RN moves to a new DeNB, the TAI broadcasted by a servicing cell of the mobile RN can change, and these processes are not defined currently.

Solution to Problem

The present invention provides a method for mobile RN obtaining broadcast TA information and a method for mobile RN switching, a method for updating user's location and a method for paging UE, which can reduce unnecessary signaling processes and network congestion in the fast-moving environment.

In order to achieve the above purpose, the present invention uses the following technical solutions:

A method for mobile relay node obtaining broadcast TA information, the method includes:

in a process that the mobile relay node (RN) switches to a target DeNB or in a process that the mobile RN, as a user equipment (UE), performs location updating, a mobile management entity (MME) or the target DeNB notifying the mobile RN of tracking area identifier (TAI) or TAC needed to be broadcasted.

Preferably, the MME notifying the mobile RN of TAI or TAC needed to be broadcasted is:

when the mobile RN, as a UE, performs location updating (TAU), a TA updating confirmation message sent by the MME contains TAI identifier or TAC which are needed to be currently broadcasted by the mobile RN; or, in an S1 switching process of the mobile RN, a switch command sent to the source DeNB by the MME contains TAI identifier or TAC which are needed to be broadcasted by the mobile RN, an RRC connection reconfiguration message sent to the RN by the source DeNB contains the TAI identifier or TAC which are needed to be broadcasted by the mobile RN;

or, in an S1 switching process of the mobile RN, a switch response message sent to the MME by the target DeNB contains TAI identifier or TAC which are needed to be broadcasted by the mobile RN, a switch command sent to the source DeNB by the MME contains the TAI identifier or TAC which are needed to be broadcasted by the mobile RN, an RRC connection reconfiguration message sent to the RN by the source DeNB contains the TAI identifier or TAC which are needed to be broadcasted by the mobile RN;

or, in an X2 switching process of the mobile RN, a switch response message sent to the source DeNB by the target DeNB contains TAI identifier or TAC which are needed to be broadcasted by the mobile RN, an RRC connection reconfiguration message sent to the RN by the source DeNB contains the TAI identifier or TAC which are needed to be broadcasted by the mobile RN.

A method for updating user equipment's (UE's) location, the method includes:

after the UE enters into a cell of a mobile relay node (RN), a mobile management entity (MME) obtaining a cell identifier of the mobile RN and an indication that this cell is a cell of the mobile RN from the mobile RN;

when the UE performs location updating (TAU), the MME assigning a TAI list to the UE.

Preferably, the MME obtaining the cell identifier of the mobile RN includes:

the UE in an idle mode enters into a connection mode in a cell of a mobile RN, an initial UE message sent to the MME by the mobile RN contains ECGI of the RN;

or, when the UE in the connection mode enters into a cell of the mobile RN through an S1 switching, ECGI of the mobile RN is contained in a path switch notification message or switch response message sent to the MME in the S1 switching;

or, when the UE in the connection mode enters into a cell of the mobile RN through an X2 switching, ECGI of the RN is contained in a path switch request message in the X2 switching process.

Preferably, the MME obtaining the indication that this cell is a cell of the mobile RN includes:

the cell identifier assigned to the mobile RN is a reserved cell identifier, and the MME determines that this cell is a cell of the mobile RN according to the cell identifier of the mobile RN;

or, when the MME obtains the cell identifier of the mobile RN, the MME obtains the indication information of the mobile RN at the same time.

Preferably, before the MME configures the TAI list for the UE, the method further comprises: the MME determining whether an RN where the UE is located is mobile RN; if the RN where the UE is located is mobile RN, performing the operation of configuring the TAI list, wherein the TAI list is a list of all TAI configured to be broadcasted in Uu interface in a forward direction of the mobile RN.

A method for paging user, the method includes:

when a mobile management entity (MME) pages a user equipment (UE), the MME sends a paging message to DeNB corresponding to each TAI identifier in a TAI list of the UE, wherein the sent paging message contains information of the mobile RN according to stored cell identifier of a mobile RN where the UE is located;

the DeNB sending the paging message to a mobile RN indicated by information of the mobile RN;

the mobile RN which receives the paging message sending the paging message to cells which are controlled by the mobile RN which receives the paging message.

Preferably, the information of the mobile RN contained in the paging message sent to the eNB by the MME obtain is a cell identifier of the mobile RN;

the DeNB sending the paging message to a mobile RN indicated by information of the mobile RN is: forwarding the paging message to a mobile RN indicated by the cell identifier of the mobile RN;

the mobile RN which receives the paging message sending the paging message to cells which are controlled by the mobile RN which receives the paging message is: the mobile RN which receives the paging message sending the paging message to cells indicated by the cell identifiers contained in the paging message.

Preferably, the information of the mobile RN contained in the paging message sent to the eNB by the MME obtain is an indication of the mobile RN;

the paging message further contains the TAI list of the UE;

the DeNB sending the paging message to a mobile RN indicated by information of the mobile RN is: the DeNB selecting mobile RN with cells by which TAI broadcasted are contained in the TAI list of the UE from all mobile RN connected to the DeNB, and forwarding the paging message to the selected mobile RN;

the mobile RN which receives the paging message sending the paging message to cells which are controlled by the mobile RN which receives the paging message is:

the mobile RN which receives the paging message selecting a cell by which TAI broadcasted are contained in the TAI list of the UE from the cells which are controlled by the mobile RN which receives the paging message, and sending the paging message to the selected cell.

Preferably, the cell identifier of the mobile RN where the UE is located and stored by the MME, is a cell in which the UE resides before the UE enters into idle mode and which is obtained by the MME.

Preferably, the MME obtaining the cell identifier of the mobile RN where the UE is located includes:

the UE in an idle mode enters into a connection mode in a cell of the mobile RN, an initial UE message sent to the MME by the mobile RN contains ECGI of the RN;

or, when the UE in the connection mode enters into a cell of the mobile RN through an S1 switching, ECGI of the mobile RN is contained in a path switch notification message or switch response message sent to the MME in the S1 switching;

or, when the UE in the connection mode enters into a cell of the mobile RN through an X2 switching, ECGI of the mobile RN is contained in a path switch request message in the X2 switching.

A method for mobile relay node (RN), the method includes:

a source DeNB of the mobile RN obtaining an instruction of whether adjacent cells of the mobile RN support mobile RN, the source DeNB selecting a target cell for the mobile RN and initiating a switching process.

Preferably, the source DeNB of the mobile RN obtaining an instruction of whether adjacent cells of the mobile RN support mobile RN is: a cell of eNB in the system broadcasting an instruction of whether this cell supports mobile RN; the mobile RN sends measurement report containing the received instructions of whether the adjacent cells support mobile RN to the source DeNB;

or, any eNB1 in the system sending an eNB configuration transmission, which contains a message required to report whether adjacent eNB2 of the eNB1 supports mobile RN, to the MME; the MME forwarding the message required to report whether the eNB2 supports mobile RN sent from the eNB1 to the eNB2 through an MME configuration; the eNB2 sends an eNB configuration transmission, which contains whether cells of the eNB2 support mobile RN and identifiers of cells which support mobile RN, to the MME; the MME forwarding the message sent from the eNB2 to the eNB1 through an MME configuration transmission;

or, any eNB1 in the system sending an eNB configuration transmission, which contains whether cells of the eNB1 support mobile RN and cell identifiers which support mobile RN, to the MME; the MME forwarding the message sent from the eNB1 to an eNB2 adjacent to the eNB1; or, any eNB1 in the system sending an X2 interface establishment request message, which contains identifiers of servicing cells of the eNB1 and instructions of whether each servicing cell supports mobile RN, to adjacent eNB2; after the eNB2 receives the X2 interface establishment request message, the eNB2 sending an X2 interface establishment response message, which contains identifiers of servicing cells of the eNB2 and instructions of whether each servicing cell supports mobile RN, to the eNB1;

or, any eNB1 in the system sending an eNB configuration update request message, which contains identifiers of servicing cells of the eNB1 and instructions of whether each servicing cell supports mobile RN, to adjacent eNB2 through an X2 interface;

after the eNB2 receives the eNB configuration update request message, the eNB2 sending an eNB configuration update response message, which contains identifiers of servicing cells of the eNB2 and instructions of whether each servicing cell supports mobile RN, to the eNB1 through the X2 interface.

It can be seen from the above technical solution that the method of the present invention can support group mobility, reduce the signaling process and network congestion.

Advantageous Effects of Invention

Through the method for mobile RN performing location updating and the embodiments and the method for UE performing location updating provided in the present invention, the relatively static UE in the RN in the idle mode can be prevented from initiating a separate TAU process, meanwhile, it can be ensured that the network can find the UE, thereby reducing signaling processes and avoiding network congestion; and in the RN switch process, a correct target node can be selected for the RN.

Through the method for paging UE and the embodiments provided in the present invention, the DeNB filters the paging messages of the UE, and the paging message is sent only to the cell of the mobile RN which the UE resides in, this can effectively reduce the message transmission of the Un interface and avoid network congestion.

BRIEF DESCRIPTION OF DRAWINGS

FIG. 4 is a work flow chart showing that the RN performs switching of the present invention;

FIG. 5 is a work flow chart of paging UE of the present invention;

FIG. 6 shows a process that an MME assigns TAI to the UE of the present invention;

FIG. 7 is a work flow chart showing that a mobile RN performs an S1 switching of a first embodiment;

FIG. 8 is a work flow chart showing that a mobile RN performs an X2 switching of a second embodiment;

FIG. 9 is a work flow chart showing that a mobile RN performs an S1 switching of a first embodiment.

BEST MODE FOR CARRYING OUT THE INVENTION

To make the objectives, technical solutions and advantages of the present invention more clear, the present invention is hereinafter described in detail with reference to the accompanying drawings.

What should be noted is that a cell of an RN has a unique (E-UTRAN Cell Global Identifier) ECGI in the high speed route. In the route which the train runs along, the RN can be assigned with different TAI. The TAI which the RN uses can be shared with ordinary cells, but in the same geographical location, the RN and the ordinary cells use different TAI, and some TAI can also be reserved for the RN and be specially assigned to the RN, and the ordinary cells do not use such TAI.

In order to solve the problems in the existing technology, the present invention provides a method for supporting group mobility, in the method of the present invention, a cell of an RN has a unique position coding, Routing Area Code (RAC) in the route along the high speed railway, and the RN supports Piblic Land Mobile Network (PLMN) in the route along the high speed railway.

Specifically, the present invention provides ways in which a mobile RN performs switching and location updating, and the mobile RN obtains broadcast TA information (TAI identifies or Tracking Area Code (TAC) needed to be broadcasted) in the switching or location updating process, so that the mobile RN can determine TAI which are needed to be broadcasted after the mobile RN switches to a new DeNB and ensure that the broadcasted TAI are in a TAI list of the UE.

Figure 3:
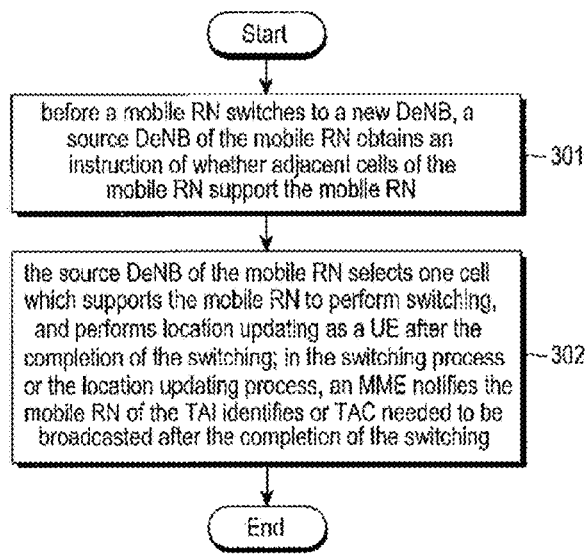
FIG. 3 is a work flow chart showing that an RN performs location updating of the present invention.

FIG. 3 is a work flow chart showing that the RN performs location updating of the present invention.

As shown in FIG. 3, the process includes:

Step 301: before a mobile RN switches to a new DeNB, a source DeNB of the mobile RN obtains an instruction of whether adjacent cells of the mobile RN support the mobile RN;

Step 302: the source DeNB of the mobile RN selects one cell which supports the mobile RN to perform switching according to the instruction obtained in the step 301, and performs location updating as a UE after the completion of the switching; in the switching process or the location updating process, an MME or target DeNB notifies the mobile RN of the TAI identifies or TAC needed to be broadcasted after the completion of the switching.

Through the operation of the step 301, the source DeNB can determine whether the adjacent cells support the mobile RN, thus, when selecting a target cell to switch, this information can be referred to select a cell which supports the mobile RN to switch, specifically, the switching can be an S1 or X2 switching.

In the switching process, the signaling interaction process between the mobile RN and the MME can be used, and the TAI identifies or TAC needed to be broadcasted after the completion of the switching can be sent to the mobile RN by the MME according to pre-configured TAI information which is needed to be broadcasted in turn in a forward direction of the mobile RN so that the mobile RN obtains the TAI identifies or TAC needed to be broadcasted, and the broadcast TAI or TAC identifies in the forward direction of the mobile RN are pre-configured, thus, it can be ensured that the TAI broadcasted by the mobile RN are in a TAI list configured for the UE.

Or, the signaling interaction process between the mobile RN and the MME can also be used in the process that the mobile RN, as a UE, performs TA updating, and the TAI identifies or TAC needed to be broadcasted by the mobile RN after the completion of the switching can be sent to the mobile RN by the MME according to pre-configured TAI information which is needed to be broadcasted by the mobile RN in turn in the forward direction.

Or, the signaling interaction process between the mobile RN and a target MME can be used in the switching process of the mobile RN, and the TAI identifies or TAC needed to be broadcasted by the mobile RN after the completion of the switching can be sent to the mobile RN by the target DeNB according to pre-configured TAI information which is needed to be broadcasted by the mobile RN in turn in the forward direction.

So, in the process that the train moves forward at high speed, TAI of cells where a plurality of relatively static UEs are in are in the TAI list of the UE, the UE does not need to initiate upward TAU process. The specific process of the above RN location updating method will be illustrated through two embodiments later.

In the above process shown in FIG. 3, the process that the mobile RN obtains broadcast TAI identifies or TAC and the specific mobile RN switching and location updating process are written together. Actually, the method for the mobile RN obtaining broadcast TAI identifiers or TAC can also be independent from the above specific switching and location updating process of the mobile RN. That is, in any-mode switching and location updating process, the method for obtaining the broadcast TAI identifies or TAC can be performed.

The present invention also provides a method for mobile RN switching, in this method, a DeNB obtains a message of whether adjacent cells support the mobile RN, and a source DeNB uses this message to select an appropriate target cell for the mobile RN's switching.

FIG. 4 is a work flow chart showing that the RN performs switching of the present invention.

As shown in FIG. 4, this method includes:

Step 401: a source DeNB of a mobile RN obtains an instruction of whether adjacent cells of the mobile RN support the mobile RN;

Step 402: the source DeNB selects a target cell which supports switching of the mobile RN for the mobile RN, and initiates a switching process.

The source DeNB of the mobile RN obtaining the instruction of whether the adjacent cells of the mobile RN support the mobile RN of the step 401 can through:

Method one: a cell of eNB in the system broadcasts an instruction of whether this cell supports the mobile RN; the mobile RN sends a measurement report containing the received instructions of whether the adjacent cells support the mobile RN to the source DeNB.

Method two: any eNB1 sends an eNB configuration transmission, which contains a message required to report whether adjacent eNB2 of the eNB1 supports the mobile RN, to the MME; the MME forwards the message required to report whether the eNB2 supports the mobile RN sent from the eNB1 to the eNB2 through an MME configuration; the eNB2 sends an eNB configuration transmission, which contains whether a cell of the eNB2 supports the mobile RN and identifiers of cells which support the mobile RN, to the MME; the MME forwards the message sent from the eNB2 to the eNB1 through an MME configuration transmission.

Method three: any eNB1 in the system sends an eNB configuration transmission, which contains whether a cell of the eNB1 supports the mobile RN and identifiers of cells which support the mobile RN, to the MME; the MME forwards the message sent from the eNB1 to an eNB2 adjacent to the eNB1, the forwarded message can use the existing messages or define a new message.

Method Four:

Any eNB1 in the system sends an X2 interface establishment request message, which contains identifiers of servicing cells of the eNB1 and instructions of whether each servicing cell supports mobile RN, to adjacent eNB2.

After the eNB2 receives the X2 interface establishment request message, the eNB2 sends an X2 interface establishment response, which contains identifiers of servicing cells of the eNB2 and instructions of whether each servicing cell supports mobile RN, to the eNB1.

Method Five:

Any eNB1 in the system sends an eNB configuration update request message, which contains identifiers of servicing cells of the eNB1 and instructions of whether each servicing cell supports mobile RN, to adjacent eNB2 through an X2 interface.

After the eNB2 receives the eNB configuration update request message, the eNB2 sends an eNB configuration update response message, which contains identifiers of servicing cells of the eNB2 and instructions of whether each servicing cell supports mobile RN, to the eNB1 through the X2 interface.

FIG. 5 is a work flow chart of paging UE of the present invention.

As shown in FIG. 5, the basic process includes:

Step 501: after a UE enters a cell of the mobile RN, an MME obtains an identifier of the cell of the mobile RN and an instruction that this cell is a cell of the mobile RN from the mobile RN, the MME receives downlink data transmission, and the MME sends a paging message to eNB corresponding to a TAI list of the UE according to context information of the UE. The paging message contains information of the mobile RN in which the UE is.

Step 502: the eNB checks whether serving cells of the eNB includes a cell corresponding to the information of the mobile RN in the paging message, if the serving cells of the eNB includes a cell corresponding to the information of the mobile RN in the paging message, the eNB sends the paging message to corresponding RN. If the serving cells of the eNB do not include a cell corresponding to the information of the mobile RN in the paging message, the eNB does not send the paging message to corresponding RN.

Step 503: the mobile RN sends the paging message to the corresponding cell.

Through the above-mentioned manner, the paging message is only sent to the eNB corresponding to the TAI list of the UE, and the paging message is only sent in mobile RN cells indicated by the mobile RN information in the paging message sent to the eNB. Thereby greatly reducing the amount of signaling interactions when paging user. The specific process of the above method for paging UE will be illustrated through specific embodiments in later.

The present invention also provides a process of a method for assigning a TAI list to the UE, which can conveniently configure TAI identifies which are needed to be broadcasted in a forward direction of a mobile RN in which the UE is as the TAI list of the UE, and can simplify the process. The process of assigning a TAI list for the UE of the present invention is specifically reflected in FIG. 2, and what is different from FIG. 2 specifically can refer to FIG. 6.

FIG. 6 shows a process that an MME assigns TAI to the UE of the present invention.

As shown in FIG. 6, the process includes (the detailed description of steps that have nothing to do with the present invention are omitted):

Step 601: after a UE is attached to the network, an MME will store information of the UE. When the UE enters into a cell of the mobile RN, a servicing cell of the UE is the cell of the mobile RN, and the MME will also store an identifier of the cell of the mobile RN. The identifier of the cell of the mobile RN can be transferred to the MME through one of the following methods:

One: the UE in an idle mode enters into a connection mode in a cell of a mobile RN, when the RN sends an initial UE message, the message contains ECGI of the RN.

Two: when the UE in the connection mode switches from an eNB to a cell of an RN of a DeNB through an S1 switching, ECGI of the RN is contained in a path switch notification message or switch response message of the S1 switching process.

Three: when the UE in the connection mode switches from an eNB to a cell of an RN of a DeNB through an X2 switching, ECGI of the RN is contained in a path switch request message of the X2 switching process.

In the present invention, the MME needs to know whether the UE resides in a cell of the mobile RN or an ordinary cell, and this can be known through ECGI: if a specific ECGI is assigned to the mobile RN, the MME can know that the UE currently resides in a cell of the mobile RN through the ECGI; or through simultaneous transmission of an instruction of the mobile RN in the above process of transferring the identifier of the cell of the RN, the instruction of the mobile RN indicates that this cell is a cell of a mobile RN, which can also let the MME know that the ECGI corresponds to a cell of a mobile RN.

Step 602: when the UE performs location updating, the MME configures a TAI list for the UE. Through the step 601, the MME knows that the current servicing cell is a cell of a mobile RN; after the step 601, the UE may initiate a location updating process. The location updating process of the UE has been described in FIG. 2, different points of the present invention are in that in the step 213 of the location updating process, the MME assigns a specific TAI list to the UE. The TAI list can be a list of TAI identifies which can be configured and broadcasted in the Uu interface in a forward direction of the RN. Other steps are the same as steps of the current location update method.

Through the above location updating mode of the UE, when the UE resides in a cell of a mobile RN and enters in an idle mode, since the UE is on a fast-moving train and the UE is assigned a TAI list which the train may pass, thus, when the mobile RN switches to a new DeNB and uses a new TAI, the UE does not need to perform the TAU process.

First Embodiment

Figure 1:
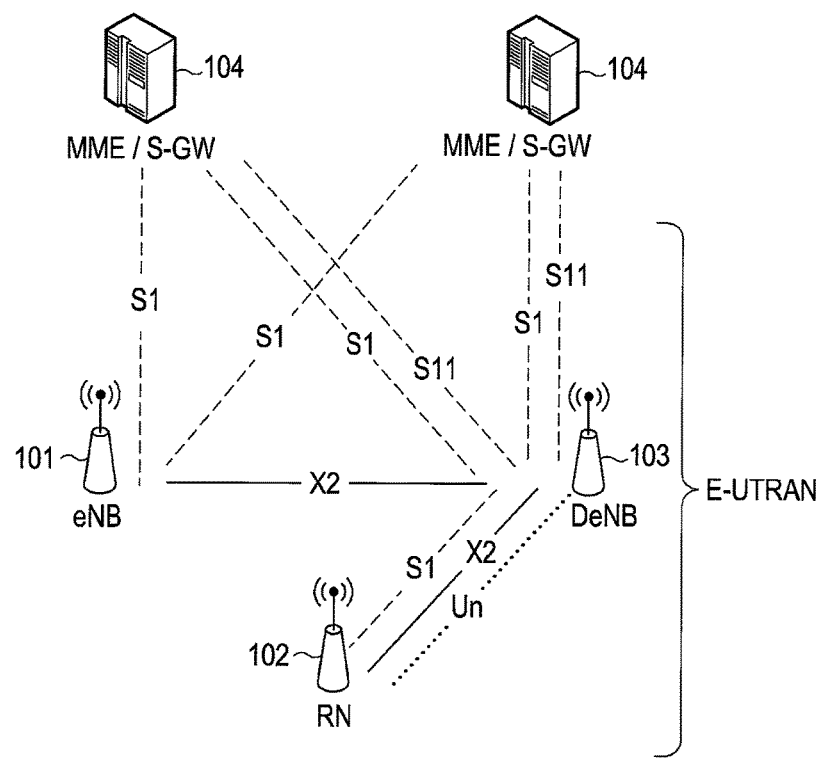
FIG. 1 illustrates a schematic diagram of an existing LTE which supports the relay node (RN)

This embodiment describes a process that the RN moves to a new DeNB through an S1 switching and the RN perform the S1 switching and TA updating, on the basis of the basic flow of RN switching and location updating shown in FIG. 1.

FIG. 7 is a work flow chart showing that a mobile RN performs an S1 switching of a first embodiment.

A specific flow diagram is shown in FIG. 7, and the detailed description of steps that have nothing to do with the present invention are omitted here, and the flow includes:

Step 701: the RN measures signal qualities of adjacent cells, and listens to control information, such as content broadcasted in broadcasted information. In a control channel of a cell of an eNB, an instruction whether this cell supports mobile RN is broadcasted. The RN sends a measurement report to the source DeNB, and the message contains a measure result of the signal qualities of the adjacent cells and instructions of whether the adjacent cells support mobile RN.

Step 702: the source DeNB decides to initiate an S1 switching. The DeNB selects a target cell. The source DeNB can know whether the adjacent cells support mobile RN through the instructions of the mobile RN reported by the RN, and the source DeNB selects a cell which supports mobile RN as the target cell to switch. The source DeNB sends a switch request message to the MME.

Step 703: a RN-MME sends a switch request message to a target eNB.

Step 704: the target DeNB sends a switch response message to the RN-MME.

Step 705: the RN-MME sends a switch command to the source DeNB.

Step 706: the DeNB sends an RRC connection reconfiguration message to the RN, and the RN switches to the target eNB. The target eNB starts to be as a DeNB of the RN.

Figure 2:
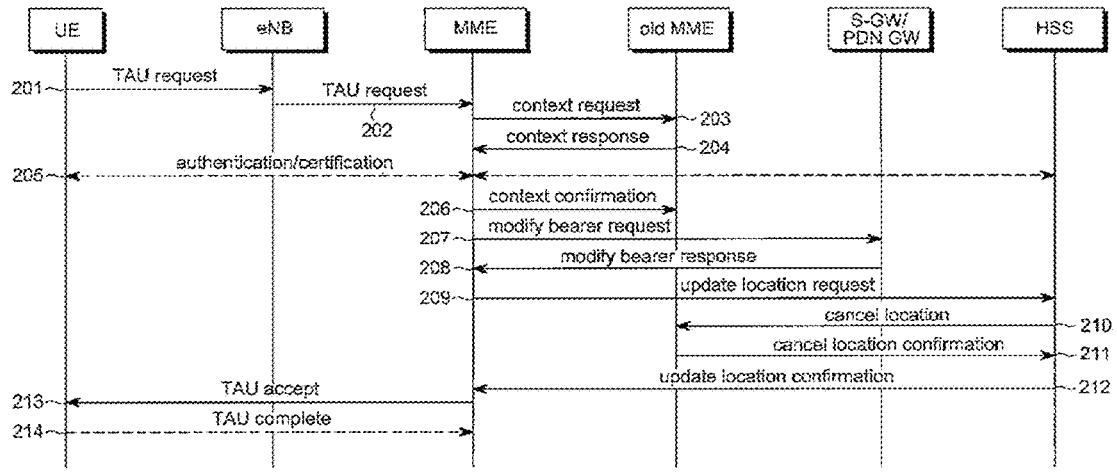
FIG. 2 illustrates a procedure for performing TAU process of the UE in the existing LTE system.

Step 707: the TAI of the cell which the RN resides in as a UE changes, the RN initiates a TA updating process. This process is shown in FIG. 2. The only difference is that when the MME sends the update confirmation in the step 213, the MME sends the TAI or TAC, which will be broadcasted next by the RN as a cell, to the mobile RN through a TA updating confirmation message. The RN broadcasts the TAI or TAC in cell broadcast information.

It should be noted, in the first embodiment, the RN listens to whether a control channel of the adjacent cell broadcasts the instruction of supporting mobile RN, and reports the instruction to the DeNB; when the DeNB selects the target cell, this instruction can be referred. Identifiers of cells of an adjacent eNB which support mobile RN are sent to the DeNB through the eNB configuration transmission and the MME configuration transmission of the S1 interface, which includes steps:

One: the eNB1 sends the eNB configuration transmission to the MME, the message contains information required to report whether cells of the eNB1 supports the mobile RN;

Two: the MME forwards the information of the step one to the eNB2 through the MME configuration.

Three: the eNB2 sends the eNB configuration transmission to the MME, the message contains information of whether cells of the eNB2 support mobile RN and identifiers of cells which support mobile RN.

Four: the MME forwards the message of the step three to the eNB1 through the MME configuration transmission.

It should be noted, the above eNB1/eNB2 can be DeNB or ordinary eNB.

Or following steps are included:

One: the eNB1 sends the eNB configuration transmission to the MME, and the message contains identifiers of cells of the eNB 1 which support mobile RN;

Two: the MME forwards the message of the step one to an eNB2 adjacent to the eNB1 through the MME configuration, and the message can reuse the current message or define a new message.

It should be noted, the above eNB1/eNB2 can be DeNB or ordinary eNB.

According to the above steps, in the first embodiment, the RN does not need to listen to control channels of adjacent cells and report instructions to the DeNB, and the DeNB selects a target cell according to stored information and the measurement report of the RN.

Further, in the flow shown in FIG. 7, in the TAU process after the completion of the RN switching, the RN-MME sends the TAI identifies or TAC, which will be broadcasted next by the RN as a cell, to the mobile RN. Actually, in the RN switching process, the existing message or new messages between the MME and the mobile RN can also be used to carry the TAI identifies or TAC which the RN needs to broadcast. For example, the TAI identifies or TAC needed to be broadcasted can be carried in the switch command sent to the source DeNB by the MME in the step 705 shown in FIG. 7, then, the TAI identifies or TAC needed to be broadcasted can be carried in the RRC connection reconfiguration message sent to the mobile RN by the source DeNB in the step 706. In this way, the mobile RN can also easily obtain the TAI identifies or TAC needed to be broadcasted, and since the broadcast TAI identifies in the forward direction of the mobile RN are pre-configured by the MME, thus, it can be ensured that TAI received by the mobile RN are in a TAI list which is configured for the UE by the MME, thereby ensuring that the UE in an idle mode does not need to initiate additional TAU process.

Furthermore, in the flow shown in FIG. 7, in the TAU process after the completion of the RN switching, the RN-MME sends the TAI identifies or TAC, which will be broadcasted next by the RN as a cell, to the mobile RN. Actually, in the RN switching process, the TAI or TAC needed to be broadcasted by the mobile RN can also be configured by the target eNB. For example, in the step 704 shown in FIG. 7, the TAI or TAC needed to be broadcasted by the mobile RN can be contained in the switch response message sent by the target DeNB, and the TAI identifies or TAC needed to be broadcasted can be contained in the switch command sent to the source DeNB by the MME in the step 705, and then the TAI identifies or TAC needed to be broadcasted can be carried in the RRC connection reconfiguration message sent to the mobile RN by the source DeNB in the step 706. In this way, the mobile RN can also easily obtain the TAI identifies or TAC needed to be broadcasted, and since the broadcast TAI or TAC identifies in the forward direction of the mobile RN are pre-configured, thus, it can be ensured that TAI received by the mobile RN are in a TAI list which is configured for the UE by the MME, thereby ensuring that the UE in an idle mode does not need to initiate additional TAU process.

The Second Embodiment

This embodiment describes a process that the RN moves to a new DeNB through an X2 and the RN perform an X2 switching and TA updating, on the basis of the basic flow of RN switching and location updating shown in FIG. 1.

FIG. 8 is a work flow chart showing that a mobile RN performs an X2 switching of a second embodiment.

A specific flow diagram is shown in FIG. 8, and the detailed description of steps that have nothing to do with the present invention are omitted here, and the flow includes:

Step 801: the RN measures signal qualities of adjacent cells, and listens to control information, such as content broadcasted in broadcasted information. In a control channel of a cell of an eNB, an instruction whether this cell supports mobile RN is broadcasted. The RN sends a measurement report message to the source DeNB, and the measurement report message contains a measure result of the signal qualities of the adjacent cells and the instructions of whether the adjacent cells support mobile RN.

Step 802: the source DeNB decides to initiate an X2 switching. The DeNB selects a target cell. The source DeNB can know whether the adjacent cells support mobile RN through the instructions of whether supporting mobile RN reported by the RN, and the source DeNB selects a cell which supports mobile RN as the target cell to switch. The source DeNB sends a switch request message to the target DeNB.

Step 803: the target DeNB sends a switch response message to the source DeNB.

Step 804: the DeNB sends an RRC connection reconfiguration message to the RN, and the RN switches to the target DeNB. The target DeNB starts to be as a DeNB of the RN.

Step 805: the TAI of the cell which the RN resides in as a UE changes, the RN initiates a TAU updating process. This process is shown in FIG. 2. The only difference is that when the MME sends the update confirmation in the step 213, the MME sends the TAI or TAC, which will be broadcasted by the RN as a cell, to the mobile RN through a TAU updating confirmation message. The mobile RN broadcasts the TAI or TAC in cell broadcast information.

It should be noted, in the second embodiment, the RN listens to whether a control channel of the adjacent cell broadcasts the instruction of supporting mobile RN, and reports the instruction to the DeNB; when the DeNB selects the target cell, this instruction can be referred. Identifiers of cells of an adjacent eNB which support mobile RN are sent to the DeNB through an establishment process and configuration update process of the X2 interface, which includes steps:

One: the eNB1 sends an X2 interface establishment request message or eNB configuration update request message to adjacent eNB2, and the X2 interface establishment request message or eNB configuration update request message contains identifiers of servicing cells of the eNB and instructions of whether the servicing cells support mobile RN.

Two: the eNB2 sends an X2 interface establishment response message or eNB configuration update confirmation message to the eNB 1, and the X2 interface establishment response message or eNB configuration update confirmation message contains the identifiers of the servicing cells of the eNB and the instructions of whether the servicing cells support mobile RN.

It should be noted, the above eNB1/eNB2 can be DeNB or ordinary eNB. Meanwhile, for each eNB1, some adjacent eNB may have X2 interfaces existed between, and some adjacent eNB may not have X2 interfaces existed between. For these eNB having X2 interfaces, the instructions of whether supporting mobile RN can be transferred through the X2 interface message in this embodiment. For those eNB not having X2 interfaces, the instructions of whether supporting mobile RN can be transferred through the S1 interface message described in the first embodiment. Similarly, in the first embodiment, the instructions of whether supporting mobile RN can be transferred between adjacent eNB through the S1 interface message of the first embodiment or the X2 interface message of this embodiment.

Further, in the flow shown in FIG. 8, in the TAU process after the completion of the RN switching, the MME sends the TAI identifies or TAC, which will be broadcasted next by the RN as a cell, to the mobile RN. Actually, in the RN switching process, the target DeNB decides the TAI identifies or TAC needed to be broadcasted by the mobile RN. For example, the TAI identifies or TAC needed to be broadcasted can be carried in the switch response sent to the source DeNB in the step 803 shown in FIG. 8, then, the TAI identifies or TAC needed to be broadcasted can be carried in the RRC connection reconfiguration message sent to the mobile RN by the source DeNB in the step 804.

In this way, the mobile RN can also easily obtain the TAI identifies or TAC needed to be broadcasted; the broadcast TAI identifies in the forward direction of the mobile RN are pre-configured, and it can be ensured that TAI identifies received by the mobile RN are in a TAI list which is configured for the UE by the MME, thereby ensuring that the UE in an idle mode does not need to initiate additional TAU process.

The Third Embodiment

This embodiment describes a specific flow chart of paging a user of the mobile RN, on the basis of the basic flow of paging a user shown in FIG. 1.

FIG. 9 is a work flow chart showing that a mobile RN performs an S1 switching of a first embodiment.

As shown in FIG. 9, the detailed description of steps that have nothing to do with the present invention are omitted here, and the flow includes:

Step 901: after the UE is attached to the network, the MME will store information of the UE. When the UE enters into a cell of the mobile RN, and the MME will also store an identifier of the cell of the mobile RN. The identifier of the cell of the mobile RN can be transferred to the MME through one of the following methods:

One: the UE in an idle mode enters into a connection mode in a cell of the mobile RN, when the RN sends an initial UE message, the message contains ECGI of the RN.

Two: when the UE in the connection mode switches from an eNB to a cell of an RN of a DeNB through an S1 switching, ECGI of the RN is contained in a path switch notification message of the S1 switching process.

Three: when the UE in the connection mode switches from an eNB to a cell of an RN of a DeNB through an X2 switching, ECGI of the RN is contained in a path switch request message of the X2 switching process.

In the present invention, the MME needs to know whether the UE resides in a cell of the mobile RN or an ordinary cell, and this can be known through ECGI: if a specific ECGI is assigned to the mobile RN, the MME can know that the UE currently resides in a cell of the mobile RN through the ECGI; or through simultaneous transmission of an instruction of the mobile RN in the above process of transferring the identifier of the cell of the RN, the instruction of the mobile RN indicates that this cell is a cell of a mobile RN, which can also let the MME know that the ECGI corresponds to a cell of a mobile RN.

Step 902: the UE enters into the idle mode. The MME needs to contains some information of the UE, such as TAI where the UE locates, the TAI list configured for the UE. If a cell which the UE resides in before the UE enters into the idle mode is a cell of the mobile RN, the context of the UE also contains identifiers of cells of the mobile RN. The MME receives downlink data notification message, and the MME checks the context of the UE. Finding the stored TAI list corresponding to the UE, if a cell which the UE resides in before the UE enters into the idle mode is a cell of the mobile RN, the context of the UE also contains identifiers of cells of the mobile RN.

Step 903: the MME sends a paging message to an DeNB which is connected to the MME and supports the TAI identifies of the UE. The paging message contains cell identifiers of the mobile RN or the instruction of the mobile RN; the instruction of the RN means that the UE resides in the mobile RN before the UE enters into the idle mode, meanwhile, the paging message also contains a TAI list needed to be paged.

Step 904: if the paging message contains the cell identifiers of RN and the TAI list, the eNB finds out a cell of corresponding RN according to the cell identifiers of the mobile RN, and forwards the paging message to the RN. If the eNB does not find out corresponding RN, the eNB will not send the paging message to the mobile RN which is connected with the eNB.

If the paging message contains the instruction and the TAI list of the mobile RN, the eNB finds out connected mobile RN and TAI broadcasted by a cell of the mobile RN is contained in the TAI list of the UE, the eNB forwards the paging message to the RN. The eNB does not send the paging message to the connected ordinary cells. Otherwise, the eNB sends the paging message according to the previously defined method.

Step 905: the RN which receives the paging message send the paging message to the UE in cells controlled by the RN. Specifically, if the paging message sent in the step 903 contains the cell identifier of the RN, then the RN which receives the paging message sends the paging message to the UE in the cell indicated by the cell identifier; if the paging message sent in the step 904 contains the instruction and the TAI list of the RN, then the RN which receives the paging message selects supported cells of which TAI are in the TAI list contained in the paging message from all the controlled cells, and sends the paging message to the UE in the selected cells.

Sending the instruction of the RN in the paging message can allow the eNB to send the paging message only to the cell of the mobile RN, and TAI broadcasted by the cell is in the TAI list of the UE. In the route along the train, there may be a plurality of trains, and the disadvantage of this method is that paging message will be sent on the trains. Sending the cell identifier of the RN in the paging message, can allow the eNB to send the paging message only to a cell of a mobile RN corresponding to the identifier and TAI broadcasted by the cell is in the TAI list of the UE, thereby greatly reducing the number of sending the paging message.

Step 906: the UE performs existing paging response process, such as service request process.

The foregoing are only preferred embodiments of the present invention, and are not used to limit the present invention. Any modification, equivalent replacement, or improvement made without departing from the spirit and principle of the present invention should fall within the scope of the present invention.

The invention claimed is:

1. A method of a user equipment (UE) in a mobile communication system, the method comprising:
receiving, from a mobile relay node (RN), a message including a tracking area identifier (TAI) list determined based on a predetermined movement route of the UE;
receiving a TAI from the mobile RN;
determining whether the received TAI is included in the TAI list; and
if the received TAI is included in the TAI list, omitting a tracking area update (TAU) process,
wherein the TAI list is assigned by a mobile management entity (MME) based on at least one of an indication indicating that the UE is located in a first cell of the mobile RN or an identifier of the first cell in which the UE is located,
wherein the TAI list is updated based on a location of the UE changed from the first cell to a second cell of the mobile RN and the updated TAI list is transmitted to the UE, and
wherein the updated TAI list includes at least one TAI to be broadcast by the mobile RN in the second cell, and the at least one TAI is transmitted from the MME to the mobile RN in a location update process of the mobile RN related to the changed location of the UE.

2. The method of claim 1, wherein the TAI list includes a plurality of TAIs corresponding to a plurality of tracking areas in the predetermined movement route, and the plurality of TAIs are broadcast in accordance with a preset order based on the predetermined movement route.

3. The method of claim 1, wherein the identifier of the first cell is an identifier of a cell in which the UE is located before the UE enters into an idle mode.

4. The method of claim 1, wherein the TAI list is updated, by the MME, based on at least one of an indication indicating that the UE is located in the second cell or an identifier of the second cell in which the UE is located.

5. The method of claim 1, wherein a paging message is transmitted to the UE in the first cell based on at least one of the indication or the identifier.

6. A user equipment (UE) in a mobile communication system, the UE comprising:
a transceiver configured to:
receive, from a mobile relay node (RN), a message including a tracking area identifier (TAI) list determined based on a predetermined movement route of the UE; and
receive a TAI from the mobile RN; and
a processor configured to:
determine whether the received TAI is included in the TAI list; and
if the received TAI is included in the TAI list, omit a tracking area update (TAU) process,
wherein the TAI list is assigned by a mobile management entity (MME) based on at least one of an indication indicating that the UE is located in a first cell of the mobile RN or an identifier of the first cell in which the UE is located,
wherein the TAI list is updated based on a location of the UE changed from the first cell to a second cell of the mobile RN, and the updated TAI list is transmitted to the UE, and
wherein the updated TAI list includes at least one TAI to be broadcast by the mobile RN in the second cell, and the at least one TAI is transmitted from the MME to the mobile RN in a location update process of the mobile RN related to the changed location of the UE.

7. The UE of claim 6, wherein the TAI list includes a plurality of TAIs corresponding to a plurality of tracking areas in the predetermined movement route, and the plurality of TAIs are broadcast in accordance with a preset order based on the predetermined movement route.

8. The UE of claim 6, wherein the identifier of the first cell is an identifier of a cell in which the UE is located before the UE enters into an idle mode.

9. The UE of claim 6, wherein the TAI list is updated, by the MME, based on at least one of an indication indicating that the UE is located in the second cell or an identifier of the second cell in which the UE is located.

10. The UE of claim 6, wherein a paging message is transmitted to the UE in the first cell based on at least one of the indication or the identifier.

* * * * *